United States Patent [19]
Schwarz et al.

[11] Patent Number: 5,926,621
[45] Date of Patent: Jul. 20, 1999

[54] METHOD FOR AUTOMATIC DIAGNOSIS OF MALFUNCTIONS

[75] Inventors: Peter Schwarz, Erlangen; Ulrich Bungert; Rolf Krämer, both of Weisendorf, all of Germany

[73] Assignee: Siemens Aktiengesellschaft, Munich, Germany

[21] Appl. No.: 08/718,493

[22] PCT Filed: Mar. 28, 1995

[86] PCT No.: PCT/DE95/00419

§ 371 Date: Sep. 30, 1996

§ 102(e) Date: Sep. 20, 1996

[87] PCT Pub. No.: WO95/27236

PCT Pub. Date: Oct. 12, 1995

[30] Foreign Application Priority Data

Mar. 31, 1994 [DE] Germany .............................. 44 11 363

[51] Int. Cl.⁶ .............................. G06F 11/00; G05B 19/05
[52] U.S. Cl. .......................... 395/183.02; 395/52; 395/54
[58] Field of Search .................................. 395/183.02, 54, 395/183.07, 183.13, 183.14, 185.03, 52, 76; 364/468.1

[56] References Cited

U.S. PATENT DOCUMENTS

| | | | |
|---|---|---|---|
| 4,183,462 | 1/1980 | Hideshima et al. | 395/185.03 |
| 4,951,189 | 8/1990 | Onodera et al. | 364/141 |
| 5,042,002 | 8/1991 | Zink et al. | 364/900 |
| 5,058,043 | 10/1991 | Skeirik | 364/550 |
| 5,142,469 | 8/1992 | Weisenborn | 364/146 |
| 5,265,222 | 11/1993 | Nishiya et al. | 395/3 |
| 5,267,145 | 11/1993 | Zifferer et al. | 364/191 |
| 5,295,231 | 3/1994 | Ogino | 395/77 |
| 5,319,783 | 6/1994 | Zink et al. | 395/700 |

FOREIGN PATENT DOCUMENTS

| | | |
|---|---|---|
| 0 314 190 | 5/1989 | European Pat. Off. . |
| 32 06 891 | 9/1983 | Germany . |
| 300 134 | 5/1992 | Germany . |
| 42 26 536 | 2/1993 | Germany . |

OTHER PUBLICATIONS

Suk I. Yoo and Chang H. Park, "An Inference Browser to Verify Knowledge Bases", IEEE; pp. 466–467, Nov. 1993.

SPS–Magazin 1993, "Zinheitliche SPS–Programmierung mit IEC 1131–3", pp. 39–40. (No translation).

SPS–Magazin 1993, "Kompatible Software für Speicher–programmierbare Steuerungen", pp. 16–19. (No translation).

Schulz, "Neue Servicewerkzeuge für SPS", Technische Rundschau, pp. 70–73. (No translation).

*Primary Examiner*—Dieu-Minh T. Le
*Attorney, Agent, or Firm*—Hill & Simpson

[57] ABSTRACT

In the case of processor or installations, or both, which are monitored by sequence control from a PLC program which is produced as a contact plan (KOP), as a function plan (FUP) or as an instruction list (AWL), the AWL code of the PLC program is analyzed by machine and is prepared in the form of a knowledge base, according to the invention, in order to prepare for diagnosis. Step chain analysis and/or a transition analysis are/is carried out in order to prepare the knowledge base.

7 Claims, 12 Drawing Sheets

METHOD FOR AUTOMATIC DIAGNOSIS OF MALFUNCTIONS

This application is a 371 of PCT/DE 95/00419 filed on Mar. 28, 1995.

BACKGROUND OF THE INVENTION

1. Field of the Invention

The present invention relates to a method for automatic diagnosis of malfunctions in processes and/or installations which are monitored by sequence control from a PLC program which is produced as a contact plan (KOP), as a function plan (FUP) or as an instruction list (AWL).

2. Description of the Related Art

Manufacturing processes and manufacturing installations are controlled by programmable Logic Controllers, which are in general called PLCs, in various fields of technology. The software of such PLCs is normally produced on programming units as a contact plan (KOP), as a function plan (PUP) or as an instruction list (AWL). This is illustrated in detail, for example, in SPS-Magazin [PLC Magazine] (1993), Issue 5, pages 16 to 19 and pages 39 to 40, in particular in the publication called "Einheitliche SPS-Programmierung mit IEC 1131-3" [Standard PLC programming with IEC 1131-3]. The forms of program representation stated there are largely equivalent and, in particular, the contact plan (KOP) and/or function plan (FUP) can be converted into an instruction list (AWL). In addition to the stated tools for programming, the distinction is also drawn between two different program types, to be precise step chain control and logic operation control.

In the event of a defect, or malfunction in a PLC-controlled process, the cause of the defect normally has to be localized using the PLC program and the operands used in it—such as markers, data words, input/output bits—in order to take suitable measures for defect rectification. Particularly well-trained specialists are required for this purpose, who carry out fault diagnosis. German Patent Document DD-A-300 134 discloses a method for monitoring, based on rules, by diagnosis and therapy control, in particular for hierarchically structured automation systems (ATS). The status of the ATS is continuously monitored in closed-loop operation, and the truth values relating to specified diagnosis conditions are at the same time kept up to date in a diagnosis vector. Empirical knowledge relating to installation movement, which is available in the form of rules, forms the knowledge base in a specific, compressed information presentation which is evaluated on an event-controlled or time-controlled basis by means of the diagnosis vector. If an ATS condition which is worthy of therapy is indicated, the control operations which are suitable on the basis of experience are implemented automatically. Time monitoring and obviousness checking are possible at the same time.

Canadian Patent Document CA-A-21 07 051 and the corresponding European Patent Document EP-A-590 571 describe a knowledge-based method for automatic diagnosis of defects in industrial production installations. In this case, a knowledge base having a hierarchy of knowledge elements is produced which provides the operator with advice and instructions, makes it possible for him to localize the cause of a fault and provides the best-possible solution for the respective problem.

SUMMARY OF THE INVENTION

The present invention is a method for automatic diagnosis of defects in processes and/or installations which are monitored by sequence control from a PLC program which is produced as a contact plan, as a function plan or as an instruction list, which is based on the problem of proposing a method for automatic diagnosis of defects or malfunctions, which method can be used in the event of a defect in a PLC-controlled installation.

The invention results in a suitable knowledge base being available in the event of a defect as malfunctions, which knowledge base can emulate the procedure used by a person carrying out a repair on a computer, using a sequence environment which is called a diagnosis shell. The diagnosis shell processes the knowledge base, uses an on-line dialog with the automation equipment to determine the suspected process status signals and reports them to the machine manager, who can thus carry out the function of the person carrying out a repair.

BRIEF DESCRIPTION OF THE DRAWINGS

Further details and advantages of the invention result from the following description of exemplary embodiments. In this case, reference is made to the figures of the drawing with function plans related to individual items, in which.

DETAILED DESCRIPTION OF THE INVENTION

In order to allow the PLC program to be converted into a structure suitable for diagnosis, it is necessary to identify existing step chains as such.

In the case of the concept of sequence control via step chains, the entire process to be controlled is split into individual step elements, which are processed sequentially. At the start of each step, a check is carried out to determine whether all the preconditions required for the process step are satisfied. If this is the case, the step is activated and the actions which make up the process step are initiated.

Subsequently, the PLC program changes to processing of the next process step, the preconditions for the next step being checked once again first of all in order to initiate the associated actions after this. An interaction thus takes place between checks of preconditions and initiation of actions, and this is repeated until the entire process sequence has been carried out completely, once.

Figure 1:
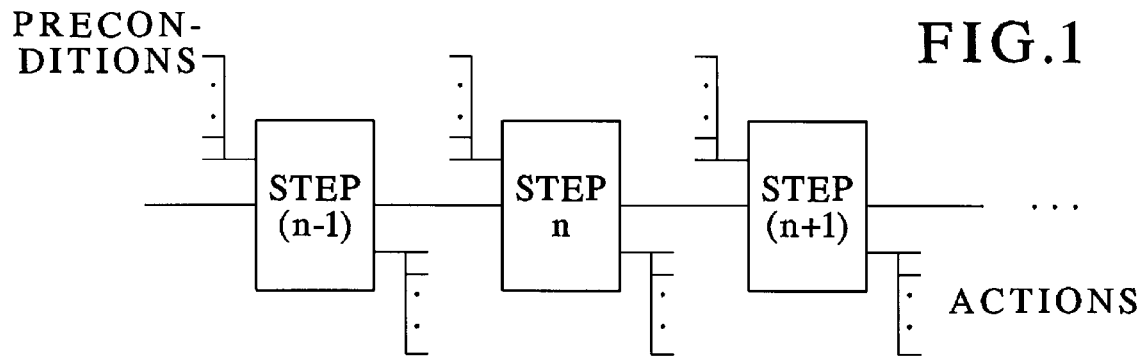
FIG. 1 is a block diagram which shows a general step chain structure.

In a PLC program, the processing of a step chain is organized like a shift register. A status bit—a so-called flag—which signals the instantaneous status of the process sequence is switched onward step by step. This ensures that only one process step is ever active at any given time and that the process steps are processed in the correct sequence. This can be seen in FIG. 1, which shows the basic structure of a step chain control program.

According to the prior art, there are various options for program execution of step chains in PLC programs. A common feature of all solutions is that the step flags are applied as memory elements, which are normally called step markers.

This results in the setting of the flags for step n depending on the presence of the flag for step n−1 and on the preconditions for step n being satisfied. The flag for step n is reset immediately when the flag for step n+1 becomes active.

Figure 2:
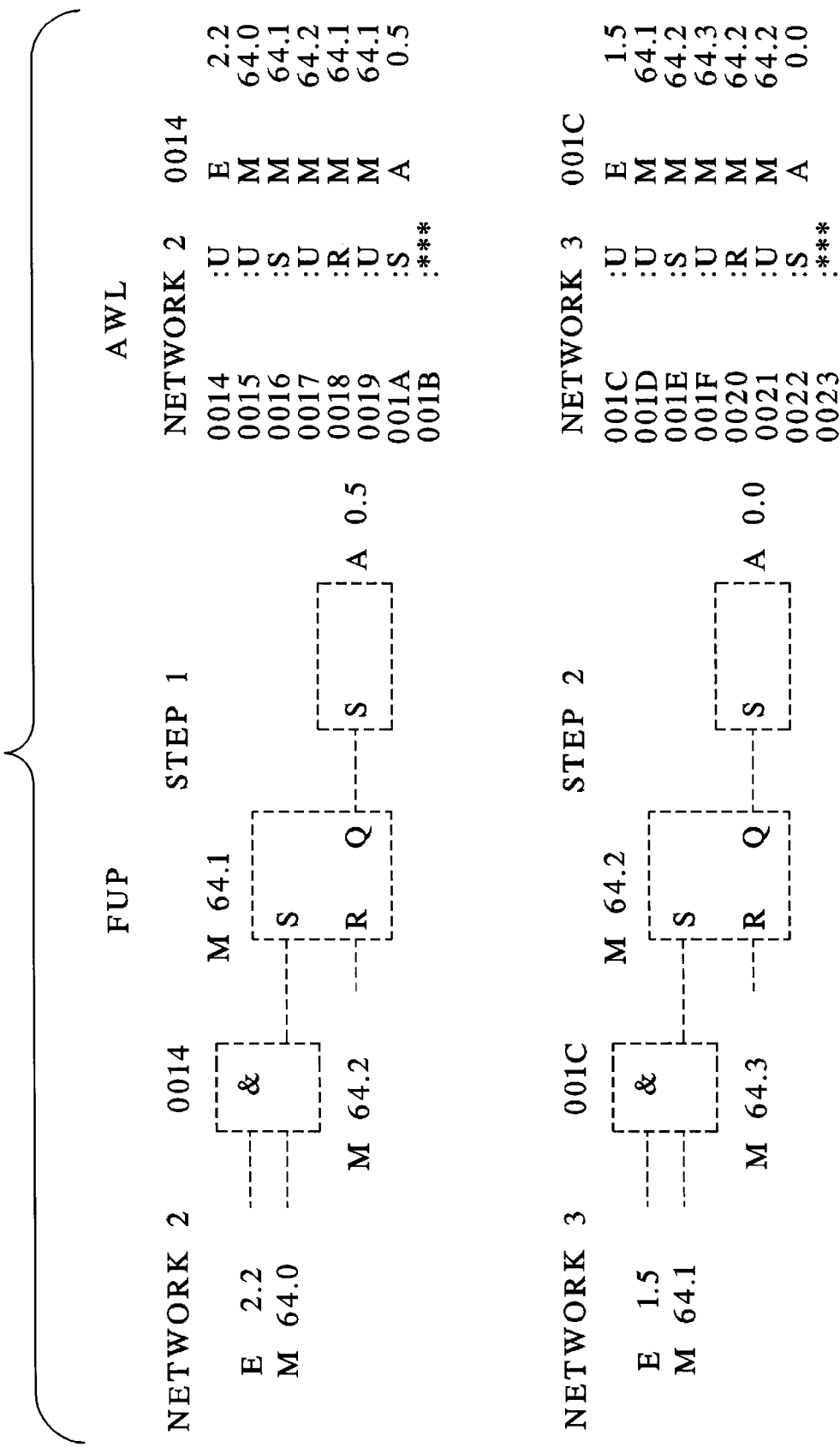
FIG. 2 are block diagram and data tables which shows the detail of a sequence control program.

FIG. 2 shows a typical detail from a sequence control program as a function plan (FUP) and as an instruction list (AWL). The control program is implemented in this case for a processing example according to FIGS. 11 to 14, using which a device for bending the connections of wired capacitors in a semi-automatic printed circuit board production line will be described further below. In this case, the step chain flags are, inter alia, the markers M64.0 to M64.7. The following statements relate to such a process.

The process is interrupted in the event of a defect. Since the stopping of the process and/or of the associated installations is linked to the stopping of the controlling step chains, the step chains within the complete PLC program must be identified first of all, for fully automatic defect diagnosis. The automatic localizing of the step chains executed in the program code is in consequence a basic precondition for systematic fault diagnosis. In the first diagnosis section, the status in which the process has stopped must be determined using the step chains.

The relationship described above can be used for automatic identification of the step chains which occur in a PLC program. In principle, when investigating an unknown AWL, each operand with a memory behavior is a potential point of origin of a step chain, for example in the case of FIG. 2:

S M 64.1.

However, this is not confirmed until the memory operand itself, to be precise M64.1 in FIG. 2, appears as a condition for the setting of a further memory operand. This is, for example,

. . .

U E 1.5

U M 64.1

S M 64.2

. . . , the second memory operand, to be precise M64.2, actually causing the first to be reset. This results, for example, in:

. . .

U M 64.2

R M 64.1.

. . .

It can thus be seen that two memory elements which are related as described represent the minimum extent of a step chain. The second memory element, to be precise M64.2, can then be investigated in a corresponding manner to determine whether this has a step chain relationship with a further memory element. This investigation is continued until all the elements in the step chain have been identified.

In the case of the latter procedure for identification of step chains in AWLs, it turns out that only one PLC Program in the form of an AWL is necessary. All the step chains implemented in the PLC program are thus identified in terms of the memory operands used. Branching or loop step chain structures can also be identified, since each step chain element may be a point of origin for one successor, or for a plurality of successors, and since a step marker which has already been used earlier may also once again be a successor of a later step marker.

In order to allow diagnosis to be carried out in the event of a defect, the step chains which have been found must be prepared as knowledge bases. According to FIG. 3, the generally widespread form of decision trees is used for this purpose, the memory operands which are identified as step markers being arranged in the topmost level of such a tree. During diagnosis, the step markers are used to determine the process status and which step would have had to be carried out as the next for execution. The interrogation of the active step marker can then be carried out in an on-line dialog between the PLC and the diagnosis computer. The cause of the step chain stopping can be found in the transitions for the process step which is no longer being executed.

A transition analysis is carried out in a second diagnosis section. In this case, a check is carried out to investigate the extent to which onward switching conditions for this next process step must be satisfied. The identification of onward switching conditions which have not been satisfied in this case provides direct information about the process components or process statuses which are responsible for the disruption of the process sequence.

Figure 4:
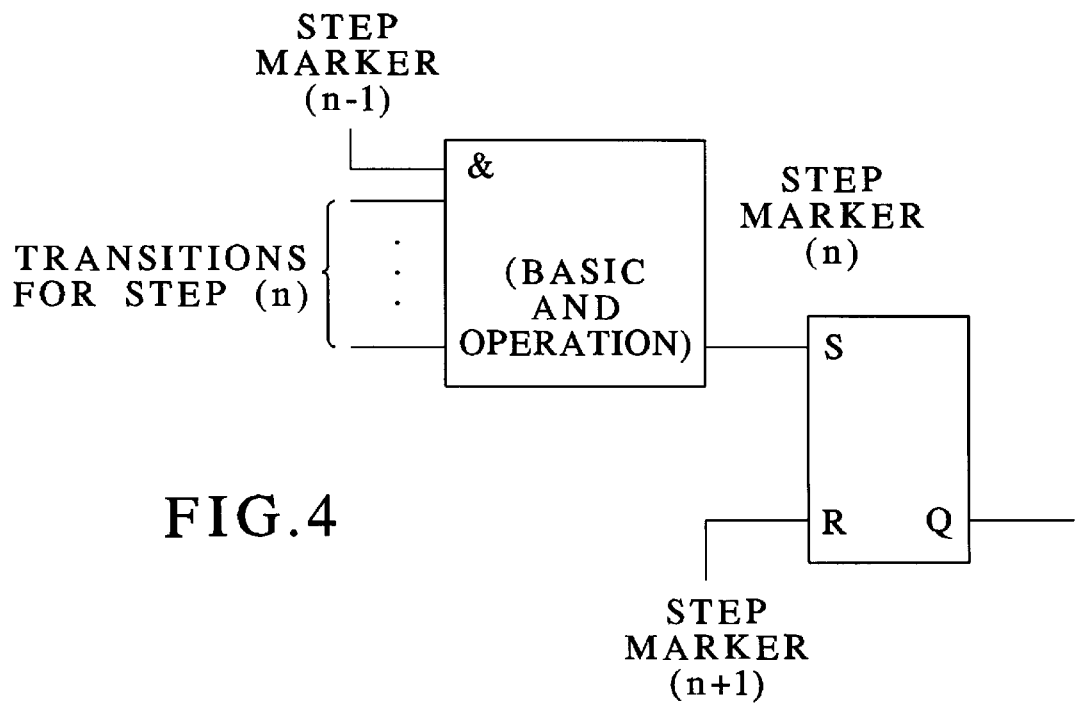
FIG. 4 is a block diagram which shows the construction of a step cell.

FIG. 4 shows a so-called step cell from which the onward switching conditions of a process step can be identified as direct or indirect inputs to the basic AND operation. In the simplest case, the enabling of the next process step depends on process statuses which are detected by means of binary sensors and must always be present in the same manner. Such process status signals are directly attached to the basic AND operation as additional inputs and represent direct onward switching conditions.

Figure 3:
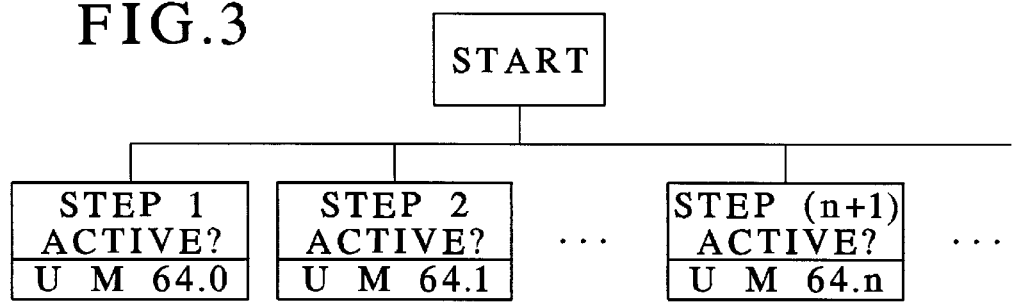
FIG. 3 is a block diagram which shows the topmost level of a decision tree for step chain diagnosis.

The latter is taken into account in the fault tree according to FIG. 3. In this case, it is assumed that questions relating to the process status signals are formulated in the same way as those included in the AWL representation of the PLC program. This results in non-inverted status questions having the expected value "high" and inverted status questions having the expected value "low". Since the occurrence of the expected value satisfies the onward switching conditions, the question semantics are positive in this concept.

Figure 5:
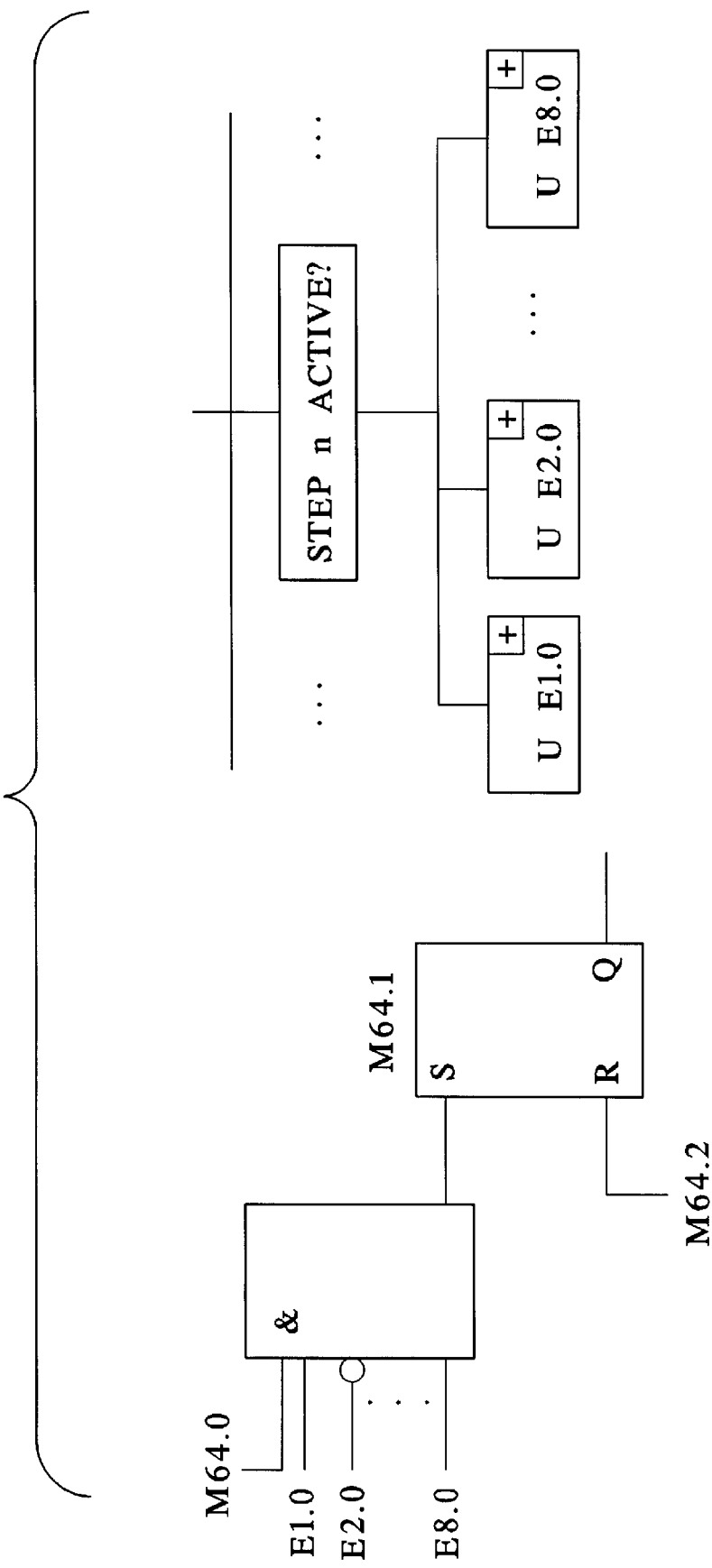
FIG. 5 is a block diagram which shows onward switching conditions in a step chain.

During diagnosis, it is necessary to mark as faulty all those process signal inputs which do not have the potential of the expected value. If marker variables are used instead of direct signal inputs, then they are dealt with in a manner which corresponds entirely with the inputs. However, markers can be further decoded using the PLC program. This is shown in FIG. 5.

Thus, in practical cases, a composite status signal is initially derived from a plurality of binary process signals and only the result of one logic operation is connected to the basic AND operation of the step cell. A plurality of cases must now be discussed separately, because of the wide range of logic operation options.

Figure 6:
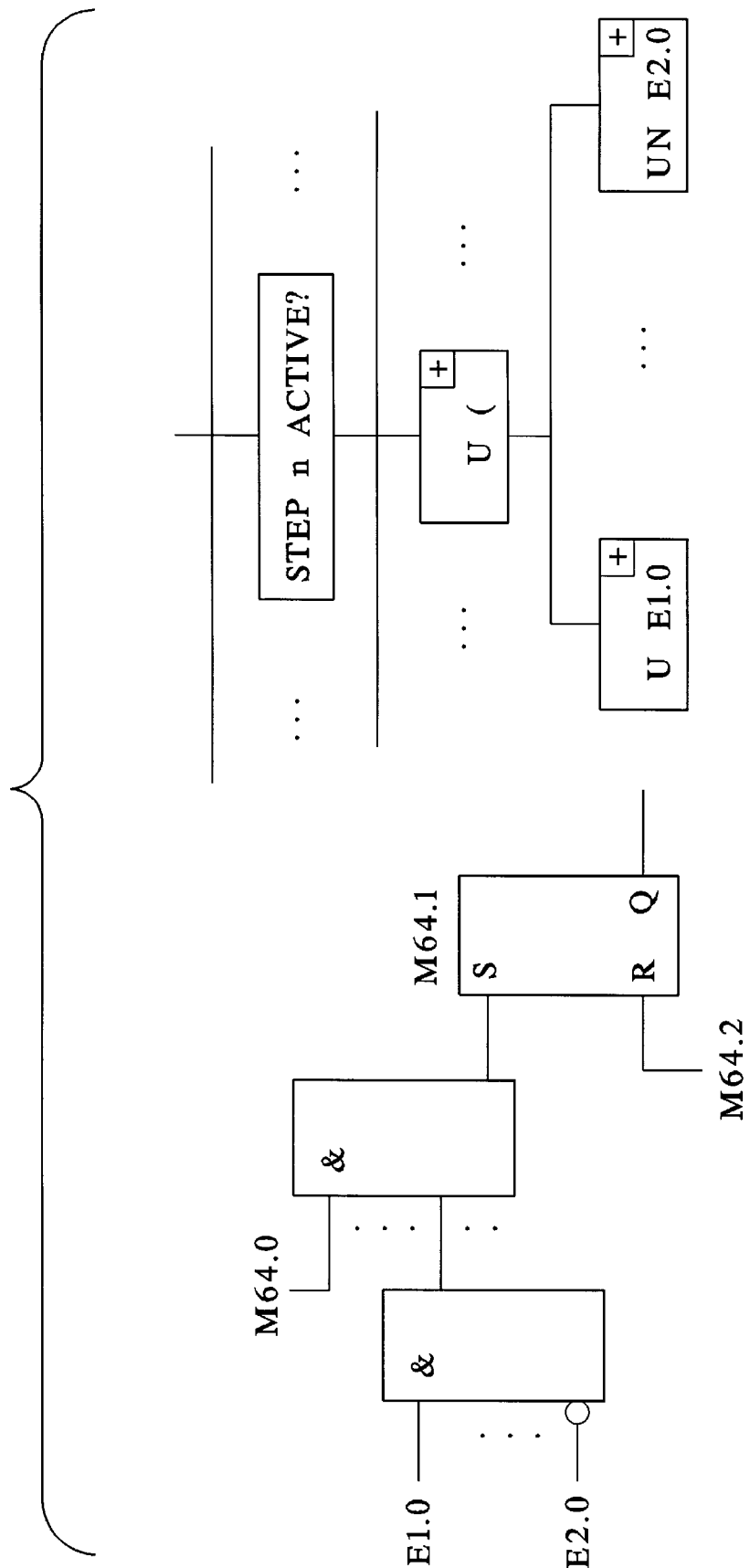
FIG. 6 is a block diagram which shows the AND logic operation on a non-inverting input of the basic AND operation, FIG. 7. is a block diagram which shows the OR logic operation on a non-inverting input of the basic AND operation.

If the output of an upstream AND gate is applied to a non-inverting input of the basic AND operation, then this input of the basic AND operation is represented by a question object in the fault tree. The inputs to the upstream AND gate are thus introduced, corresponding to their representation in the AWL, as pure question objects in an additional level of the fault tree. The question semantics are also always positive in this case since only the expected values at all the inputs of the upstream AND gate supply the expected value for the input of the basic AND operation. This can be seen in FIG. 6. Thus, when diagnosis is being carried out, all those process signal inputs which do not have the potential of the expected value are reliably marked as being faulty.

If an upstream OR gate is connected to a non-inverting input of the basic AND operation, then the input of the basic AND operation is also represented by a question object in this case. The inputs of the upstream OR gate are arranged in accordance with the AWL, as an additional level in the fault tree. The question semantics also remain positive in this case once again, since the expected value of the basic AND operation is satisfied only when at least one process input of the upstream OR gate is at the expected value potential.

Figure 7:
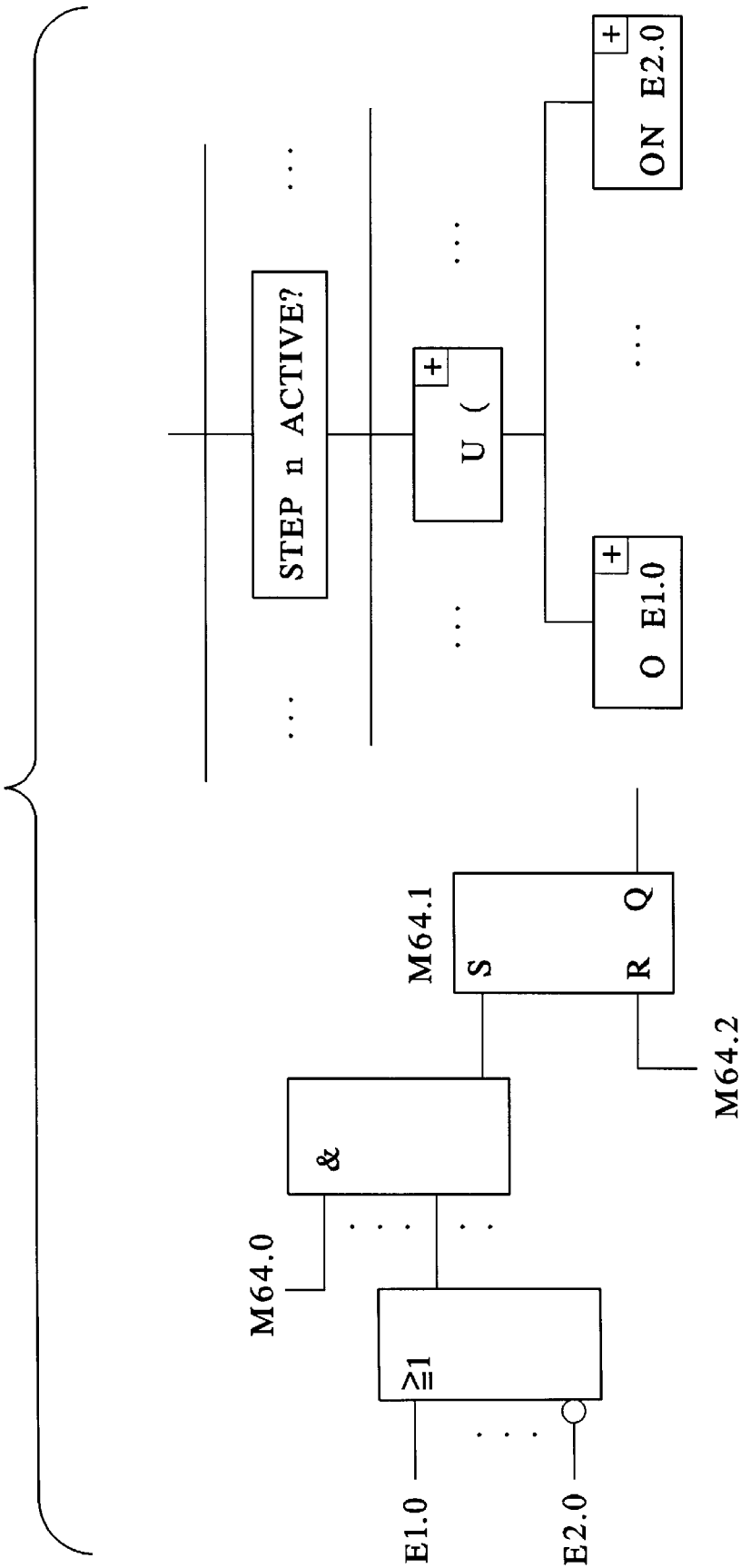

When diagnosis is being carried out, the OR gate is marked as being suspect only when it does not supply the expected value of the basic AND operation at the output. In this case, every input of the OR gate is suspect in the same manner, since it is not clear from the logic structure of the PLC program which of the linked process signals would have had to have assumed its expected value in the specific situation. This is shown in FIG. 7.

If an upstream AND gate is connected to an inverting input of the basic AND operation, then this input is represented by a question object UN in the fault tree. The inputs of the upstream AND gate also result in a further level in the fault tree, in accordance with the design of the AWL, in this case. In contrast to the two cases dealt with so far, the question semantics are negative here, since the expected values at the inputs of the upstream gate supply the initial value "high" and thus do not satisfy the expected value of the basic AND operation.

Figure 8:
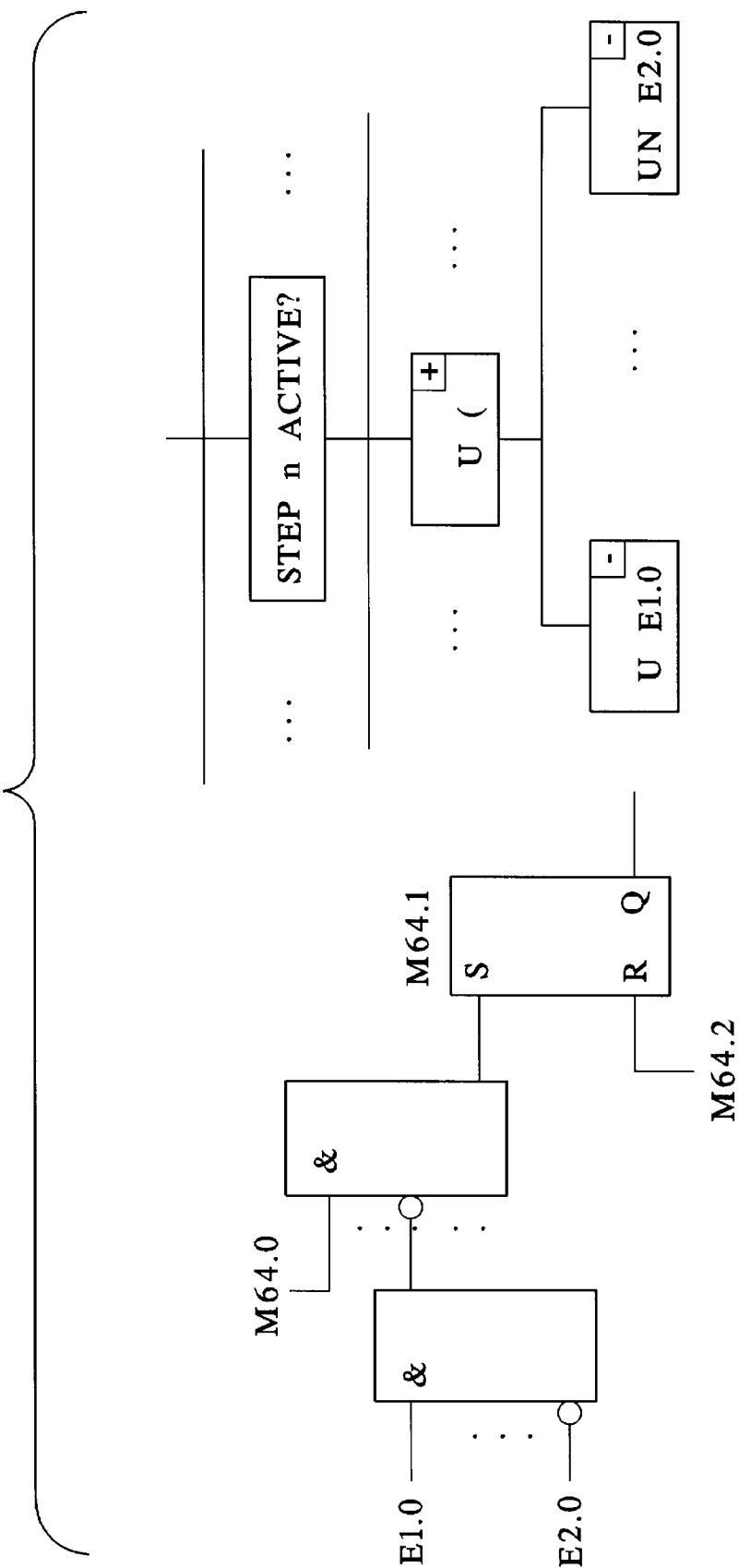
FIGS. 8 and 9 are block diagrams which show corresponding logic operations for an inverting input of the basic AND operation.

When diagnosis has been carried out, the upstream AND gate is always identified as a defect indicator when all its inputs are at the expected value potential. Corresponding to the OR logic operation, previously dealt with, on non-inverting inputs of the basic AND operation, each of these inputs is now a potential defect indicator and must be marked as such. This is shown in FIG. 8.

Figure 9:
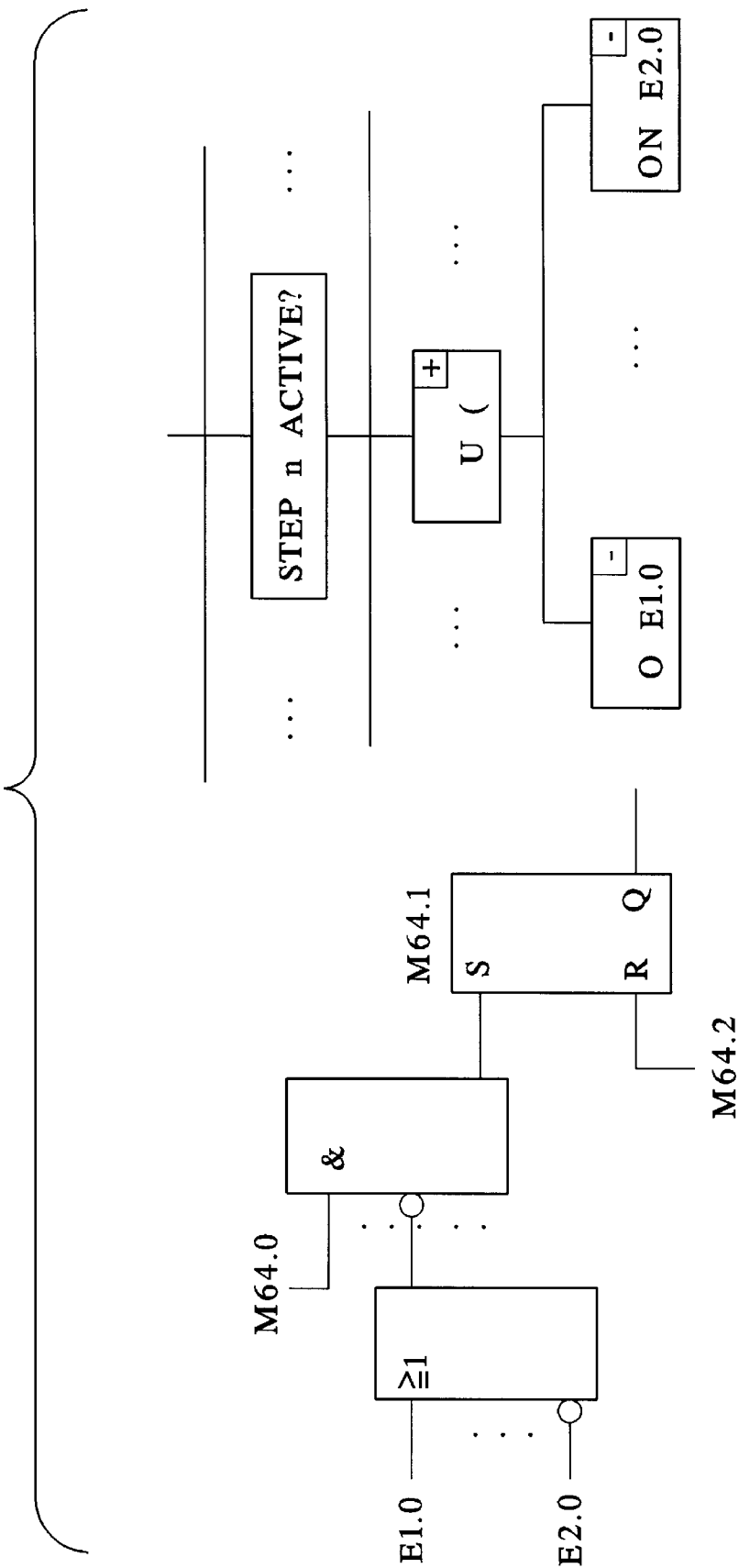

If an upstream OR gate is connected to an inverting input of the basic AND operation, then this input is marked in a corresponding manner to the preceding text by UN. The inputs of the OR gate are converted in an entirely corresponding manner into a further question object level in the fault tree. The question semantics of this new level are negative again, because of the inverting input of the basic AND operation. The OR gate supplies the expected value of the basic AND operation "low" at the output only when none of its inputs is at the expected value potential. The latter situation is illustrated in FIG. 9. The result of this is that any input of the OR gate which is at the expected value during diagnosis prevents onward switching of the process step chain and is thus a reliable indicator to the cause of the present process defect.

The preceding examples show that each transition input of the basic AND operation and, if appropriate, upstream logic gates is represented in the fault tree as a question object. In this case, the hierarchy level of the question objects in the fault tree correspond to the hierarchy of the logic operation levels in an FUP representation of the PLC program. In the fault tree itself, the questions relating to the process statuses are formulated in the same way as those which appear in the AWL representation of the PLC program. This is called the expected value concept.

Onward switching conditions which are subject to a plurality of logic operations can also be implemented using these fundamental principles. If it is not just the process status signals which are always present at the inputs of a logic element which is upstream of the basic AND operation, but, in a hierarchical arrangement, the output signals from other logic gates, the above measures can easily be extended to a plurality of upstream levels. Equivalent statements thus apply.

Apart from the static transition conditions considered above, which are used to monitor whether specific process statuses are present in a predetermined manner at the time when the step chain switches onward, dynamic onward switching conditions are also normal and necessary in PLC programs. These monitor whether a specific number of events have occurred, that is to say they act as counters, or whether a predetermined time has passed since the occurrence of an event, that is to say they act as timers. The outputs of such program elements can be connected to the inputs of the basic AND operations. They must also be analyzed automatically during diagnosis.

In detail, the RS flipflop, the counter and the timer must be noted in this context: if an RS flipflop is connected to the non-inverting input of a basic AND operation, then this is suspected of being faulty if its output is not at the potential of the expected value during the step chain diagnosis. The possible cause of this is that the flipflop has not been set correctly in the process sequence, as a result of which its set input is suspected to be faulty. However, it is also possible for the flipflop, although it has been set, to have been reset prematurely by a faulty process status. The reset input is thus suspected to be faulty, in the same manner.

Figure 10:
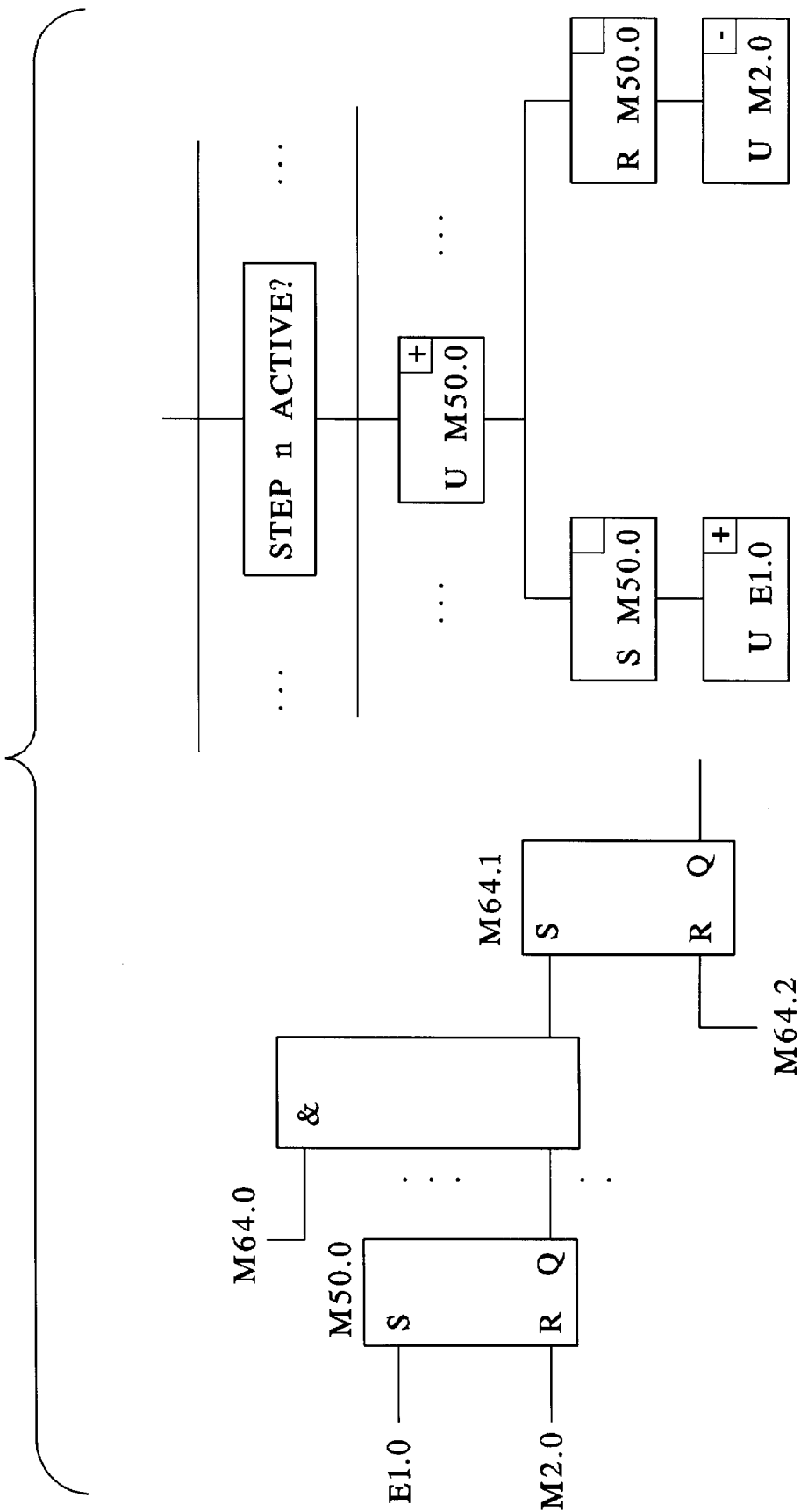
FIG. 10 is a block diagram which shows the derivation of a fault tree structure
Figure 11:
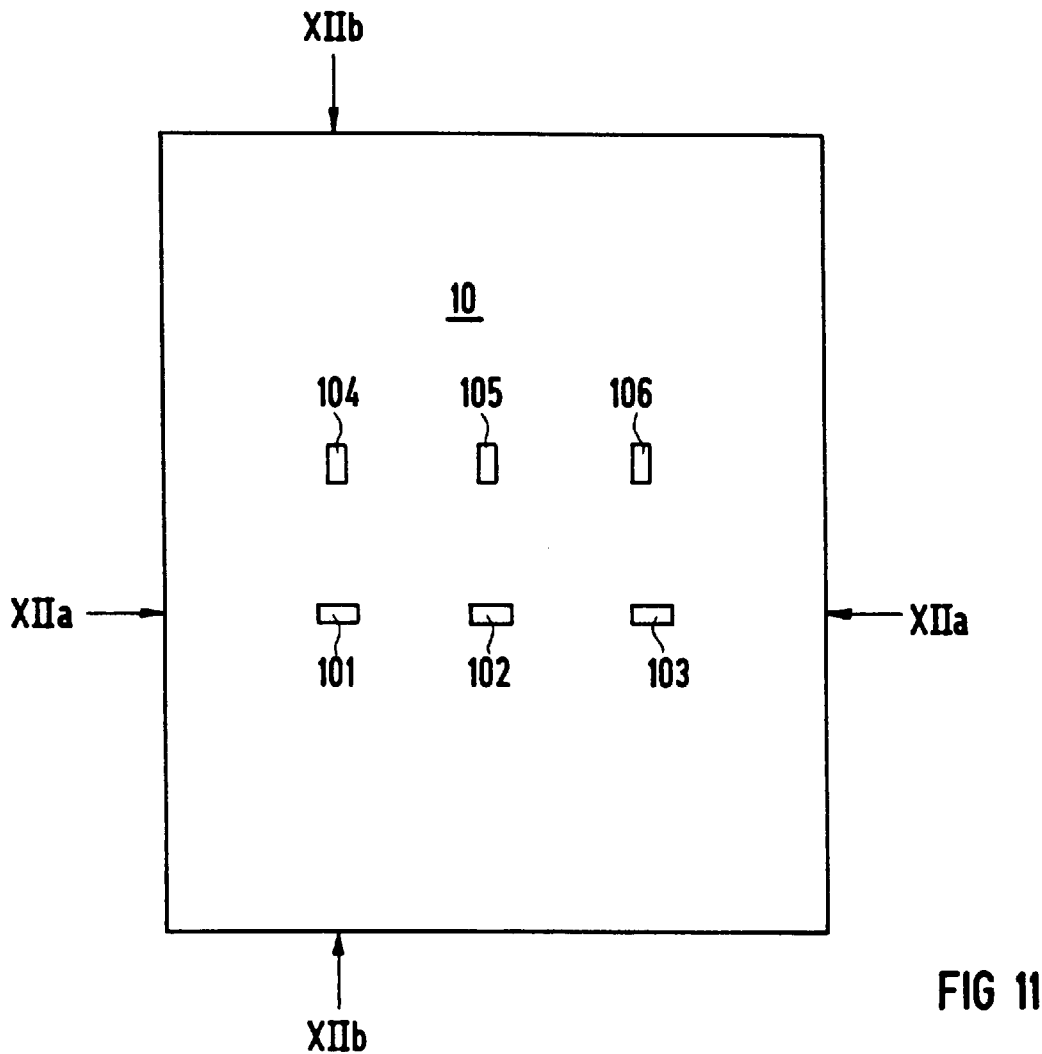
FIGS. 11 is a plan view of a circuit board.
Figure 12A:
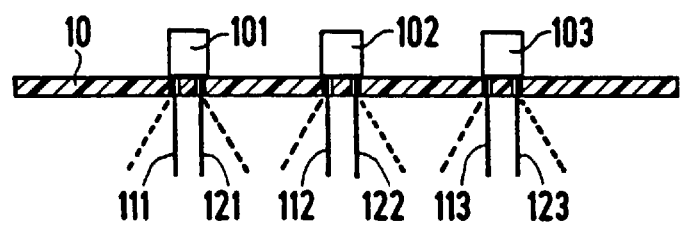
FIG. 12a and 12b are side cross sections of an equipped circuit board.
Figure 12B:
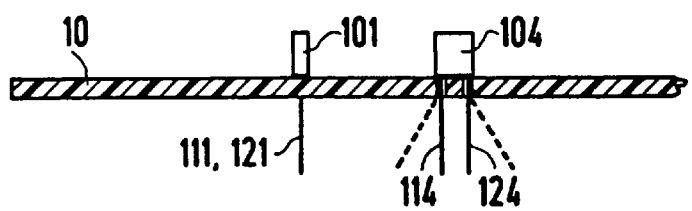

In order to convert a flipflop into a fault tree structure in accordance with the AWL, objects for the set and reset input must be inserted in the fault tree. These objects serve exclusively structural criteria. The conditions for setting and resetting are attached as a further level in the fault tree, in accordance with the expectation concept. This is illustrated in FIG. 10.

A counter also acts in a similar manner to a flipflop during diagnosis. The essential difference is that there is no need for a single event to occur at the time of the transition of the step chain, but for a defined number of events.

If a counter has not reached its intended final count during diagnosis, the input is included in the list of process status signals which are suspected to be faulty. The conversion into a fault tree structure is carried out in a corresponding manner.

If a timer is processed as an input of a basic AND operation, the consideration of the static process statuses cannot clarify which fault has occurred in the time sequence, since no automatic diagnosis sequence takes place immediately at the instant when the process step chain stops. A so-called timer object is inserted here, whose input conditions when the expected value at the output is not satisfied are included in the list of process status signals which are suspected to be faulty.

Figure 13:
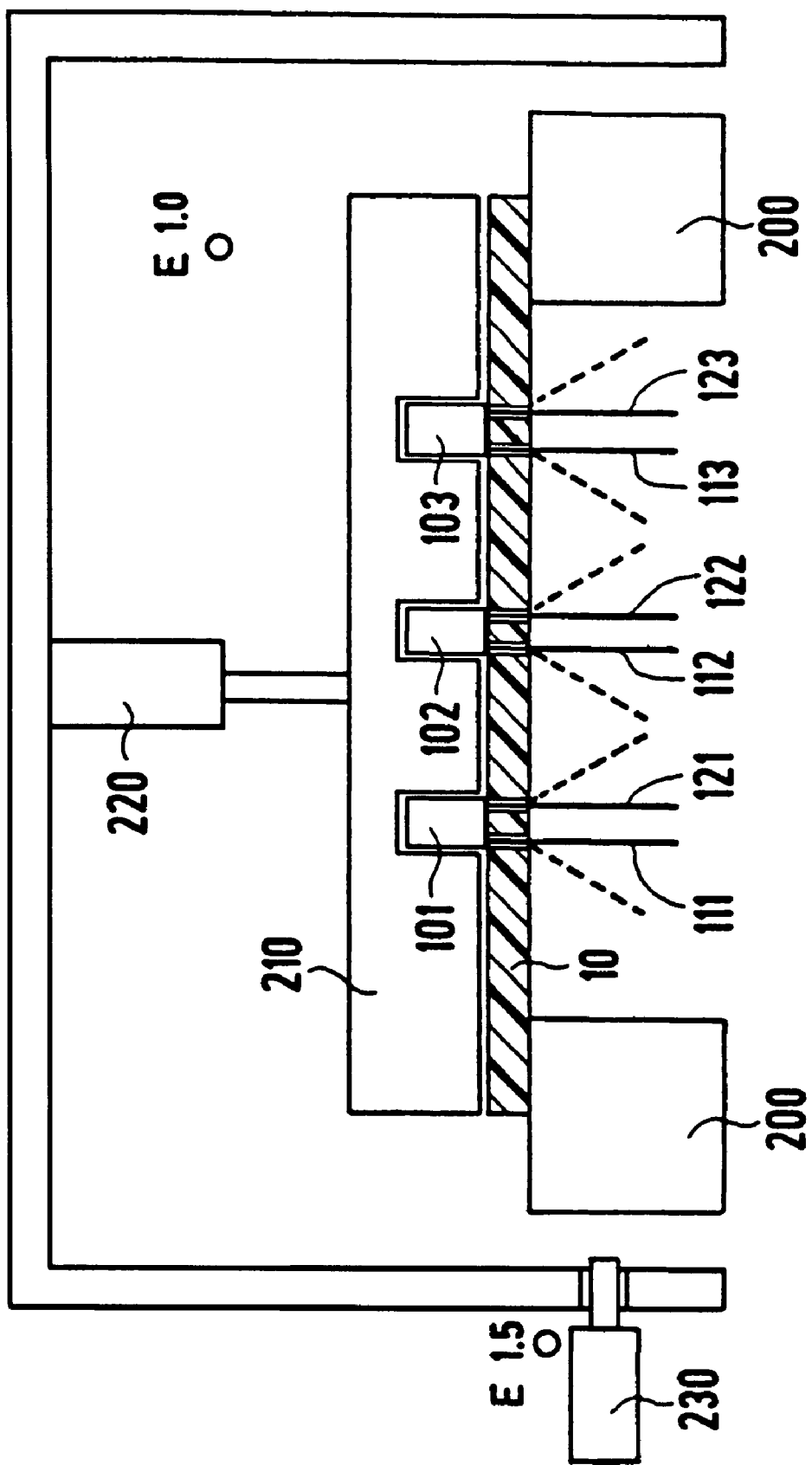
FIG. 13 is a side cross section of an equipping apparatus.
Figure 14:
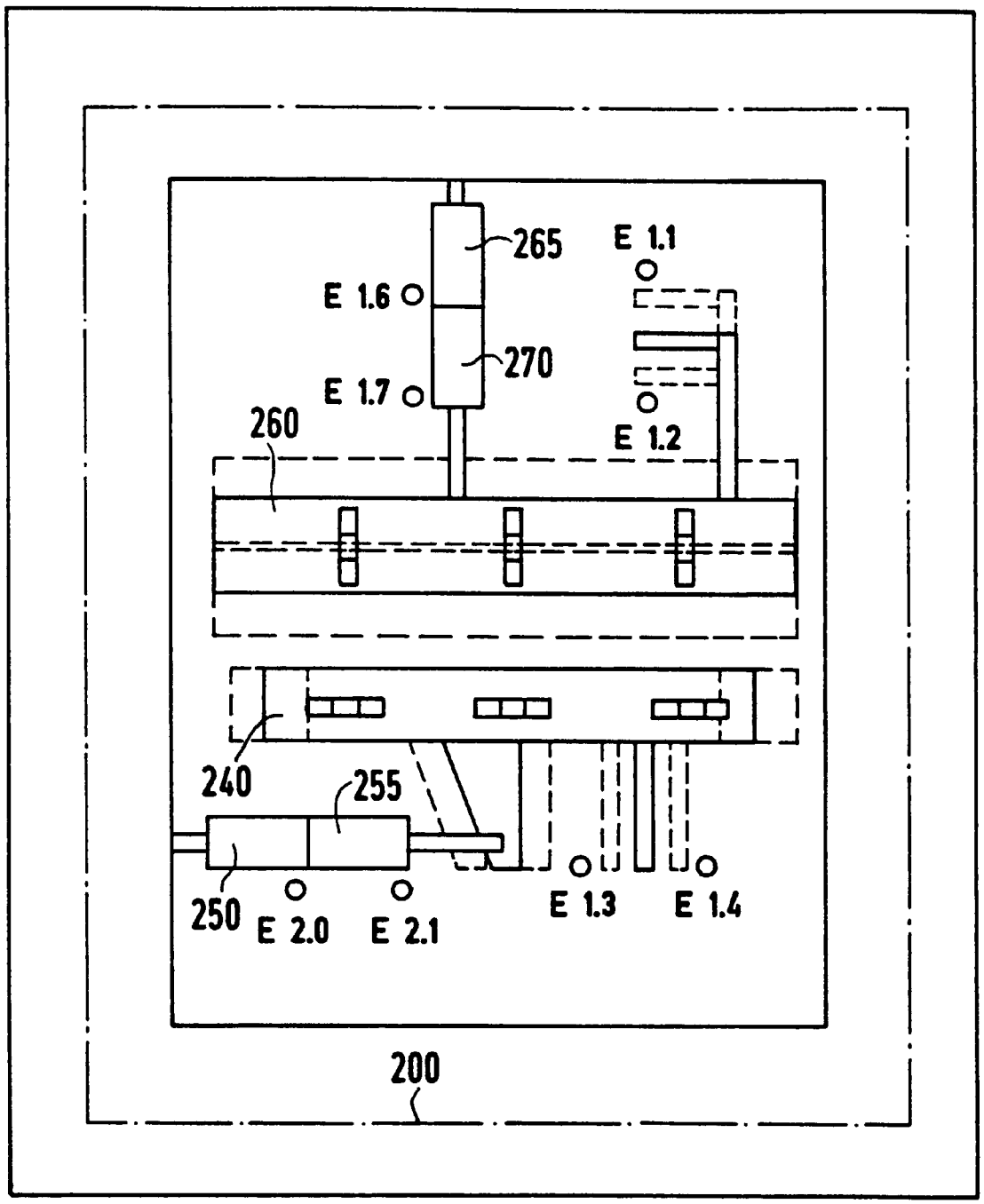
FIG. 14 is a plan view of an equipping apparatus which show the use of the latter principles for a specific manufacturing task and FIG. 15 is a block diagram which shows a decision tree implemented for this purpose.

The diagnosis method described above has been tested for various PLC-controlled assembly processes: one simple application, for example, is in fitting components to a printed circuit board, in the case of which both wired capacitors and SMD components have to be fitted. Such a printed circuit board is designated 10 in FIGS. 11 and 12, and has holes 11, 12 etc. which are provided for accommodating capacitors 101 to 106. The fitting of such capacitors 101 and so on can be carried out by hand, connecting wires 111,121 and so on which are associated in each case with a capacitor 101 and so on being bent in a defined manner by an automated device. However, it is desirable for the entire manufacturing process to be carried out in an automated manner, for which purpose appropriate manufacturing devices are required. FIGS. 13 and 14 show a manufacturing device which comprises a holder 200 into which in each case one board 10 and so on, which is fitted with capacitors 101 and so on, can be inserted. In order that the capacitors 101, 102 and so on are fixed in position during processing, they are locked by a pressure plate 210. This can be raised and lowered vertically using a pneumatic cylinder 220. The pressure plate 210 is positively held in position during the bending process with the aid of a locking cylinder 230. The connecting wires 111, 121 and so on of the capacitors 101 and so on which are arranged in the longitudinal direction are bent to the right and left with the aid of a longitudinal slide 240. The longitudinal slide 240 is operated by two series-connected pneumatic cylinders 250 and 255. If the left-hand cylinder 250 is located at the right-hand stop, and the right-hand cylinder 255 is located at the left-hand stop of the respective movement path, then the longitudinal slide 240 is in the center position between the capacitor limbs.

The capacitors 101 and so on, which are arranged in the transverse direction, are processed with the aid of a transverse slide 260 which is constructed with two series-connected pneumatic cylinders 265 and 270 in the same manner as the longitudinal slide 240. A main valve, which is not illustrated in detail, is controlled in order to release the compressed-air supply. The sensor signals for the controller are made available by digital proximity switches E1.1 to E2.1, whose position is given in FIG. 14. The position of the pressure plate 210, of the locking cylinder 220 and of the two slides 250 and 255 can thus be detected.

For controlling the processing process by the device 200, monitoring is carried out by a programmable logic automation unit (AG) whose program is in the form of an instruction list and which is shown in the attachment. In detail, this comprises an organization module OBI and various program modules PB1 to PB3. The sequence is as follows:

The three program modules PB1, PB2 and PB3 are called up by the organization module OB1, which is processed cyclically. The program module PB1 comprises 14 networks in which, essentially, the individual steps of the processing process are carried out. A check is carried out in network 1 to determine whether the device is in a basic position and the step chain is not active at that time. If this is satisfied and a waiting time has elapsed, the marker M64.0 is set and the step chain is thus started.

An investigation is carried out in the network 2 to determine whether the pressure plate 210 is in the operating position, and the locking cylinder 220 is then moved forward. The first step is thus completed, which is indicated by the setting of the step marker M64.1, which means the activation of step 2.

An investigation is carried out in the network 3 to determine whether the locking cylinder 240 is moved up. As soon as this is satisfied, the pressure plate cylinder 210 is moved out, and the third step marker M64.2 is set.

The networks NW4 to NW11 have specific functions during the fitting process in an entirely corresponding manner, the step markers M64.3 to M65.1 being assigned thereto. The remaining networks NW12, NW13 and NW14 serve to start a waiting time and to terminate the program module, respectively, when the transverse slide and the longitudinal slide reach the respective limit positions.

The program module PB2 serves to derive from the sensor signals from the transverse slide and longitudinal slide when both slides are in the center position at the same time. This information is combined in the step marker M67.0. The program module PB3, which is assisted by the function modules FB1 and FB2, finally implements a parts counter and is not important for sequence control itself.

An instruction list corresponding to attachment 1 can be produced by reverse translation of the program which carries out the processing on the automation unit of the bending device. This is a typical example of how the diagnosis must be carried out in the event of a defect:

First of all, it is not possible to identify immediately whether step chains have been implemented and, if appropriate, the memory operands with which the step chains have been designed. In general, it is very tedious and time consuming to analyze the transition conditions of the individual steps in the program code.

By using the step chain analysis method described above, it is now possible with the assistance of a computer to find out which of the operands used are related to one another in a step chain. In the example being considered, these are the markers M64.0 M64.1 M64.2 M64.4 M64.5 M64.6 M64.7 M65.0 M65.1. Building on the step markers which have been found, the topmost level of a decision tree can now be applied. This provides a critical aid for carrying out defect diagnosis. During diagnosis, an investigation is carried out to find the step in the chain where the manufacturing process has stopped.

The transition analysis is carried out in an entirely corresponding manner. In the event of a defect, all the transitions for the process step which is currently being executed must be fed back, except for sensor signals. The application to onward switching of the said step markers M64.5 to M64.6 shows that the marker M67.0 must be set for the step chain to continue onward at this point. The status of the step marker M67.0 depends on the input signals E1.1, E1.2, E1.3, E1.4, E1.6, E1.7, E2.0, E2.1. In consequence, all the said input signals are attached to the marker M67.0 in a further level, as question objects.

Figure 15:
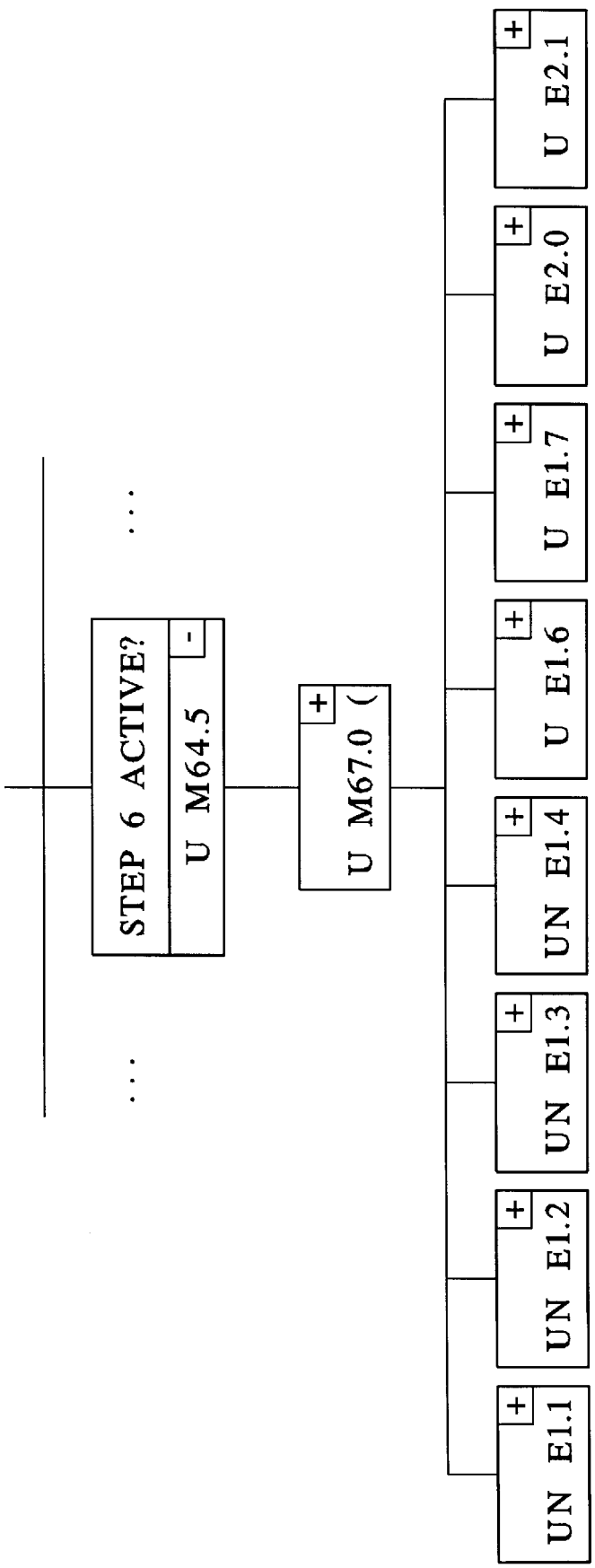

In the described example, one branch of the decision tree is thus fed back from the installation, except for the input signals. Such a design of this branch of the decision tree is shown in FIG. 15. In this way, it is easy to investigate which of the input signals has or have blocked the processing of the step chain. In the case of a comprehensive installation having several hundred input signals and, to some extent, transition conditions which are highly interlaced in the overall program, the above preparation means that the diagnosis process is considerably simplified.

The fault tree which is implemented in FIG. 15 can not only be illustrated graphically, but can also be stored as a knowledge base for an expert system. If an expert system shell is used which has an on-line process interface to automation units, then this expert system shell can make use of the automatically produced knowledge base and, in the event of a defect, can on the one hand determine the step where the manufacturing process stopped and, on the other hand, which input signals are responsible for the stoppage.

In the case of the example which is described with reference to FIGS. 11 to 14, this can mean that it has not been possible to complete the process step activated by M64.5, because M67.0 was not set. However, M67.0 was not set because, for example, E1.1 was not activated and E1.7 is not set. From the assignment list which is normal for PLC programs, it can be seen that the transverse slide 260 and the associated pneumatic cylinders 265, 270 have not been moved out. The cause of the fault has thus been found in a largely automated manner, and can be rectified after a minimal fault localization time.

As a result of the method described in detail above, the machine operator is given the critical information about the location and thus the reason for a cause of the fault, within a very short time, without himself having to have any knowledge relating to familiarity with a PLC controller.

Although other modifications and changes may be suggested by those skilled in the art, it is the intention of the inventor to embody within the patent warranted hereon all changes and modifications as reasonably and properly come within the scope of his contribution to the art.

We claim:

1. A method for automatic diagnosis of defects in at least one of processes and installations which are monitored by sequence control from a PLC program which is produced as a contact plan, as a function plan or as an instruction list, comprising the following steps:
   a) converting PLC programs which are a contact plan or a function plan into an instruction list,
   b) in order to prepare for diagnosis, analyzing AWL code of the PLC program by machine, including:
      carrying out a step chain analysis, including the substep of:
         identifying step chains executed in the program code in terms of memory operands used and in terms of their sequence and,
      in consequence, automatically locating step chains which are executed in the program code,
   c) forming a knowledge base of the step chains found in step b and deriving a topmost decision level of a fault tree from said knowledge base,
   d) determining a process feature which leads to a defect together with a diagnosis shell, from the fault tree produced in step b.

2. A method as claimed in claim 1, further comprising the step of:
   automatically identifying step chain and logic operation program sections in the PLC program.

3. A method as claimed in claim 1, wherein said step of preparing the knowledge base includes the step of:
   carrying out a transition analysis to prepare the PLC program as a knowledge base.

4. A method as claimed in claim 3, wherein in the case of step chain controllers for transition analysis, investigating onward switching conditions of individual steps in the step chain analysis and feeding back the onward switching conditions to process status signals.

5. A method as claimed in claim 4, further comprising the steps of:
   decoding logic links during the transition analysis and
   completing the fault tree which is applied during the step chain analysis.

6. A method as claimed in claim 3, wherein in the case of logic operation controllers, investigating the switching conditions and feeding back the switching conditions to process status signals.

7. A method as claimed in claim 1, further comprising the step of:
   carrying out the diagnosis by a computer.

* * * * *